Patented Feb. 28, 1933

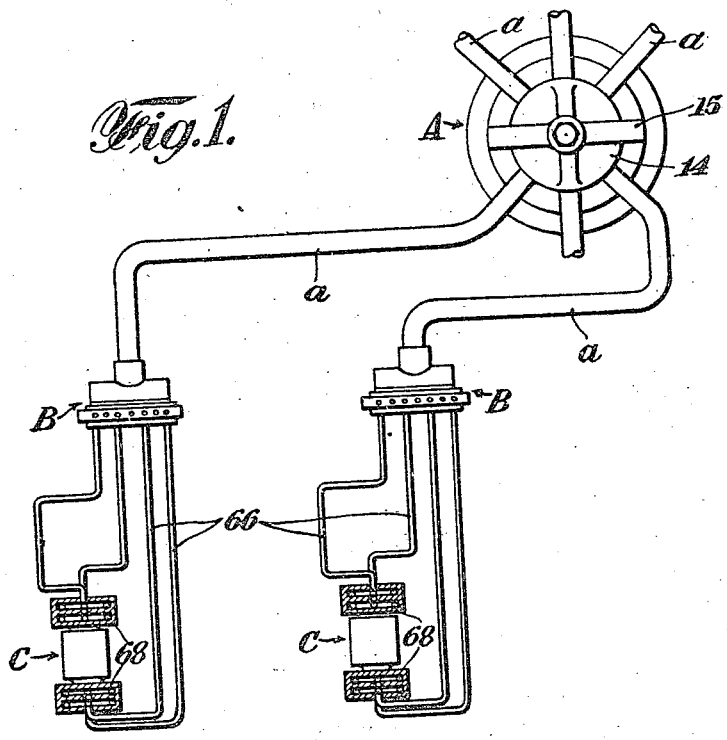
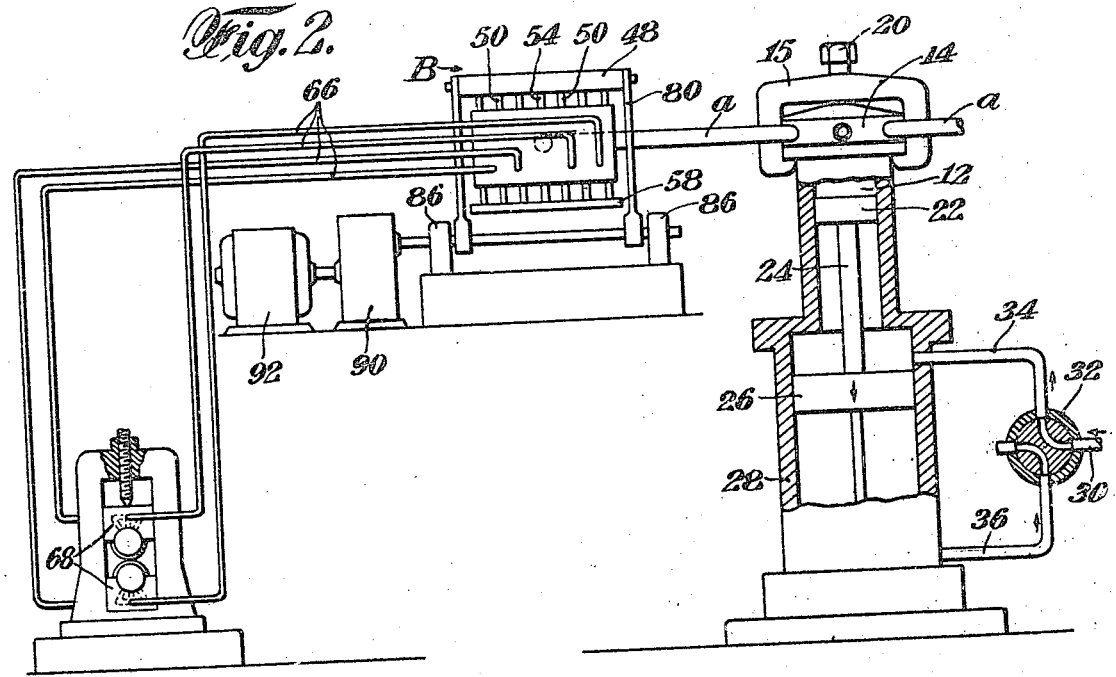

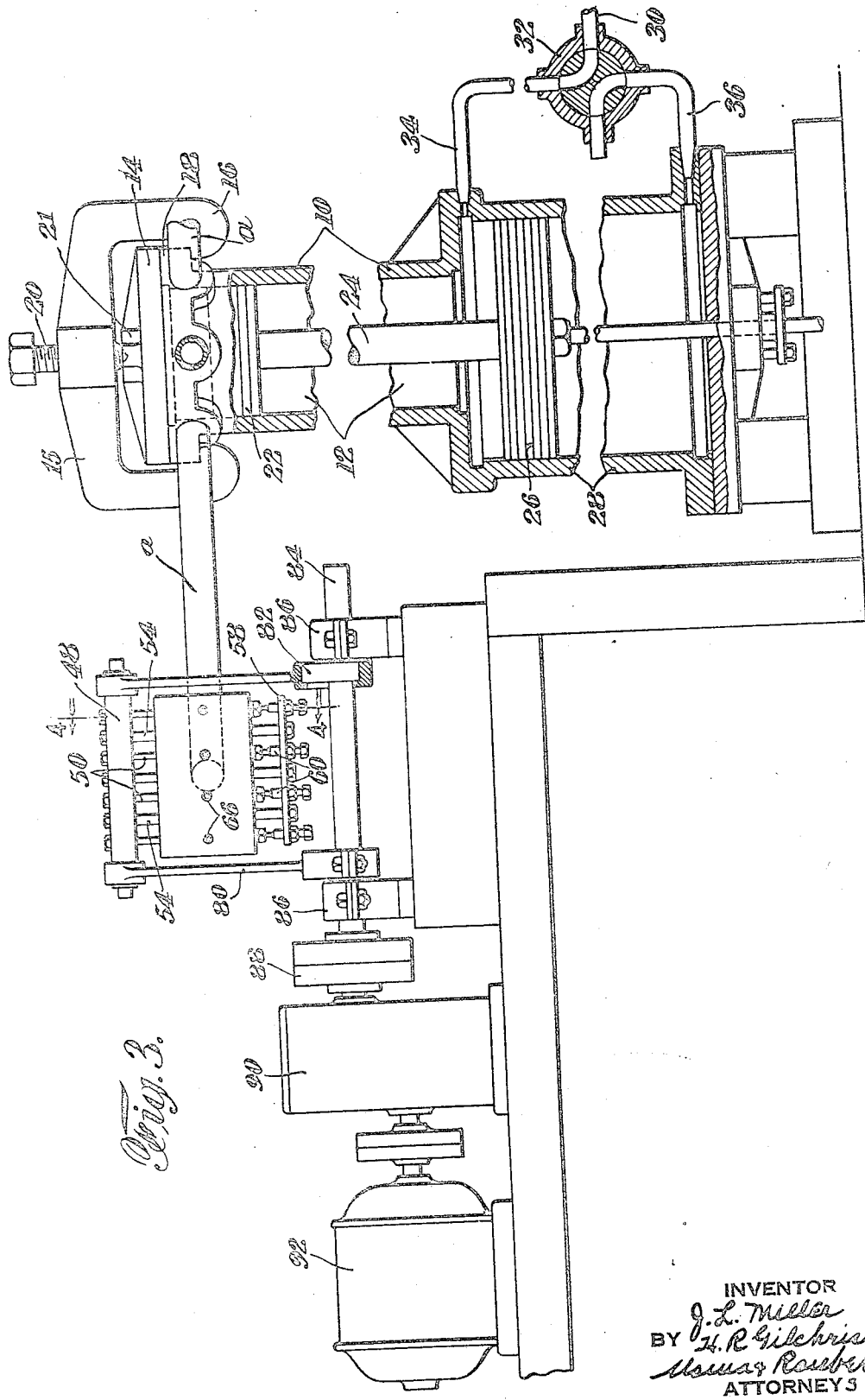

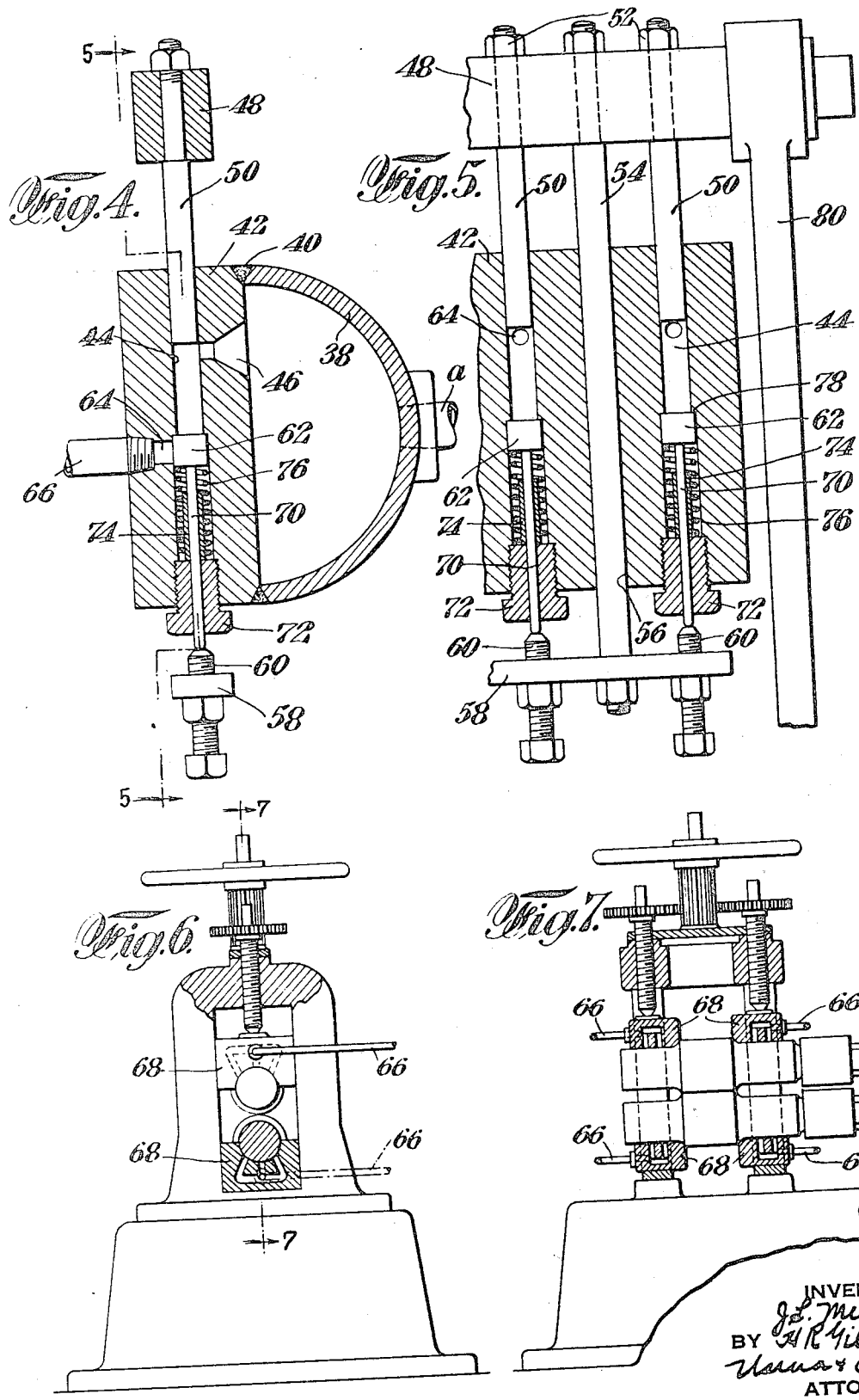

1,899,472

UNITED STATES PATENT OFFICE

JAMES L. MILLER AND HARRY R. GILCHRIST, OF YOUNGSTOWN, OHIO

SYSTEM FOR LUBRICATING THE ROLL NECKS OF ROLLING MILLS

Application filed June 11, 1931. Serial No. 543,698.

This invention relates to an improved lubricating system adapted for periodically supplying shots of a predetermined quantity of lubricant to the roll neck bearings of rolling mills at substantially uniform time intervals.

The system includes a source of a lubricant supply and means for hydraulically extruding a lubricant to a plurality of distributors which in turn force the lubricant to a plurality of roll neck bearings on the rolling mills located at points remote from the source of lubricant supply. Each distributor includes a plurality of motor driven plungers operating in respective cylinders, these plungers serving to force predetermined shots of lubricant to each roll bearing point, the distributor being served by a manifold common to all of the cylinders, the inlet of lubricant being under control of the plungers and the outflow of lubricant from the distributor being under positive control of mechanically actuated valve members, all as will hereinafter more fully appear from the following detailed specification when read in connection with the accompanying drawings.

In the drawings:—

Fig. 1 is a somewhat diagrammatic view illustrating the rolling mill lubricating system in plan;

Fig. 2 is a side elevation of the apparatus, parts being broken away in the interest of clearness, other parts being diagrammatically illustrated to facilitate simplicity of illustration;

Fig. 3 is an enlarged view partly in elevation and partly in section showing the distributor and the power actuated lubricant supply;

Fig. 4 is an enlarged transverse section on line 4—4 of Fig. 3;

Fig. 5 is a longitudinal section through a portion of the distributor, the view being taken on line 5—5 of Fig. 4;

Fig. 6 is a view of the strip rolling mill showing rolled neck bearings and the lubricant ducts connected therewith;

Fig. 7 is a sectional view on line 7—7 of Fig. 6.

Referring first to the general layout of the lubricating system, A represents a source of lubricant supply, which as hereinafter described, includes a hydraulic ram or other fluid actuated means for forcing a supply of heavy grease-like lubricant to a plurality of distributors B which are connected by ducts *a* with the supply source A. The distributors are connected by suitable ducts hereinafter described to the roll neck bearings of the rolling mills C.

Referring more particularly to Fig. 3, the lubricant supply includes a cylinder 10 having a chamber 12 normally closed by a head 14 which is removably secured to the cylinder by a yoke 15 having hooked ends 16 which engage the underside of a flange 18 forming part of the cylinder, the yoke carrying a threaded clamp bolt 20, the lower extremity of which presses against a boss 21 formed on the cylinder head.

A plurality of pipes *a* lead from the lubricant supply chamber to separate distributor members B. The lubricant is forced from the chamber 12 by means of a piston 22 having a rod 24 connected to a ram 26 operating in a cylinder 28. The ram 26 is adapted to be reciprocated by a fluid pressure, either hydraulically or by means of compressed air or steam. Assuming the ram to be hydraulically operated, water under pressure may be supplied to a pipe 30 leading to a four-way valve 32 which is connected by pipes 34 and 36, respectively, communicating with the top and bottom of the cylinder 28.

In the position illustrated, the ram 26 and piston 22 have reached the limit of the upstroke, this condition existing when the source of lubricant supply from the cylinder 12 has been substantially exhausted. In the position shown in Fig. 3, the fluid entering the pipe 30 will flow through the four-way valve and by way of pipe 34 to the top of the cylinder. This will retract the ram 26 and the piston 22 whereupon a fresh supply of lubricant will be introduced into the supply chamber 12. The four-way valve will then be turned ninety degrees from the position illustrated. This will permit the fluid to flow from pipe 30 by way of three-way valve to pipe 36 into the bottom of the cylinder, thus forcing the ram upwardly and extruding grease-like or heavy lubricant to the several distributors B. The pressure of water, air or steam introduced from the pipe 30 is exerted on the under surface of the ram 26 which it is noted is of greater diameter than that of the piston 22. Thus, there is an appreciable pressure differential which greatly facilitates the extrusion of the heavy lubricant.

Each pipe $a$ leads to a distributor B. These distributors are of identical construction and a description of one will suffice for all. As best shown in Figs. 3 to 5 inclusive, each distributor includes a manifold 38 which is welded or otherwise secured, as indicated at 40 to the distributor structure 42. This structure is bored at spaced intervals to provide a plurality of cylinders 44, and each cylinder communicates by means of a port 46 with the manifold 38.

A cross head 48 carries a number of plungers 50 which are shouldered at their upper ends and secured thereto by means of nuts 52. The cross head also has secured thereto a plurality of guide rods 54 which slidably engage guide apertures 56 formed in the distributor structure. To the lower extremities of the guide rods is fastened a cross bar 58 which carries a plurality of adjustable screws 60 which actuate valve members 62.

Valve members 62 within the cylinders 44 control the flow of lubricant through outlet ports 64 to the ducts 66 which lead to the roll neck bearings 68. As clearly indicated in Figs. 1 and 2, there are four pipes 66 leading to the four bearings 68, two of the ducts serving the top and bottom roll neck bearings at one side of the rolling mill and two other ducts serving the top and bottom roll neck bearings at the other side of the mill.

The valve members 62 include depending valve stems 70, the lower extremities of which are adapted to coact with the adjustable screws 60 carried by the cross bar 58. These valve stems are guided in gland nuts 72 threaded into the lower part of the distributor structure as clearly illustrated in Figs. 4 and 5. A sleeve 74 loosely surrounds the stem 70 and outside of the sleeve there is a light spring 76 which normally tends to press the valve 62 upwardly against a shoulder 78 formed in the cylinder bore.

The cross head 48 together with the several plungers 50, guide rods 54 and cross bars 58 are adapted to be reciprocated by pitmen 80 actuated by suitable eccentrics 82 carried by the distributor shaft 84 mounted in suitable bearings 86 secured to a base plate as shown. The shaft 84 is connected, by means of shaft couplings 88 and suitable reducing gearing enclosed in a housing 90, with a half-horse power variable speed motor having a speed of four hundred seventy five to two thousand revolutions per minute. The gear reduction in the transmission enclosement housing 90 is approximately one to four thousand eight hundred thirty, thus it is clear that the torque of the high speed motor is converted into a slow and powerful reciprocating movement which is imparted through the pitmen 80 to the several plungers operating within the distributor. This is of importance in rolling mill lubrication because of the great pressure exerted between the necks of the mill rolls and their bearings.

It is essential to proper lubrication that that lubricant be supplied under high pressure and at a substantially uniform rate so as to prolong the bearing life and avoid the objectionable interruption of rolling due to bearing failures. At the same time, in the interest of economy, it is highly desirable to furnish just so much lubricant as is required to adequately lubricate the roll neck and its bearing without undue waste. The described distributor mechanism accomplishes this desirable result in its operation. Upon each stroke of each plunger, a predetermined quantity or shot of lubricant is delivered to each roll neck bearing.

From the drawings and description, it will of course be apparent that grease-like lubricant is delivered under considerable pressure from the supply source 12 to the manifolds 38. This pressure will be sufficient to force a lubricant through each of the inlet ports 46 into the cylinders 44. But, this constant pressure is not permitted to force the lubricant directly to the rolled neck bearings, the flow being controlled by the valve members 62 which normally close the outlet ports 64 when the cross head 48 is on the upstroke or in its uppermost position. Upon the downward movement of the plungers 50, the latter close off communication through ports 46 with the manifold and at the same time the confined body of grease or other lubricant within the cylinder is forced against the valve member 62, thus pressing it downwardly against the action of the spring 76 and uncovering the outlet port 64 whereupon the continued downward movement of the plunger forces the predetermined quantity or shot of grease to the respective roll neck bearing. Upon the upward stroke of the cross head, the screws 60 carried by the cross bar 58 positively move the valve member 62 to the position where they close communication between the cylinders 44 and the outlet port 64.

While we have described quite specifically the structural details of the embodiment of the invention herein illustrated, it is not to be construed that we are limited thereto since various modifications and substitutions of equivalents may be made by those skilled in the art without departing from the invention as defined in the appended claims.

What we claim is:—

1. A system for lubricating the roll necks of rolling mill rolls comprising a plurality of roll neck bearings, a lubricant distributor structure having a plurality of cylinders, each of which is connected by an individual duct with one of said roll neck bearings, plungers reciprocating in said cylinders for forcing lubricant to said bearings, means for supplying lubricant to said cylinders, a cross head supporting said plungers, guide rods secured to said cross head and slidingly engaging guide apertures formed in the distributor structure, means for reciprocating said cross head, valve members controlling communication between the cylinders of said distributor and said roll neck bearings, and means movable in unison with said cross head limiting the movement of said valve members in one direction and effective to cause their movement in the opposite direction.

2. A system for lubricating the roll necks of rolling mill rolls comprising a plurality of roll neck bearings, a lubricant distributor structure having a plurality of cylinders each of which is connected by an individual duct with one of said roll neck bearings, plungers reciprocating in said cylinders for forcing lubricant to said bearings, a manifold secured to said distributor, inlet ports connecting said cylinders with said manifold, each of said ports being located at a point in the length of said cylinders substantially opposite the inner extremities of said plungers at the end of their outward stroke, outlet ports, each located at a point in the length of said cylinders substantially or approximately opposite the inner extremities of said plungers at their inward stroke, valve members slidable in said distributor cylinders arranged to control the flow of lubricant from said cylinders through said outlet ports, said valves being adapted to be forced by the lubricant to uncover said outlet ports upon the inward movement of said plungers, power means for reciprocating said plungers, and means movable in unison with said plungers for positively moving said valve members to position to cover said outlet ports.

3. A system for lubricating the roll necks of rolling mill rolls including a distributor adapted to force predetermined shots of lubricant to the roll neck bearings, said distributor having a plurality of cylinders, each adapted to be connected by an individual duct with a roll neck bearing, a cross head carrying plungers which reciprocate in said cylinders, guide rods secured to said cross head and slidable through guide bores formed in the distributor, a motor driven mechanism for reciprocating said cross head and parts connected therewith, a cross bar secured to said guide rods, valve members slidable within said cylinders, lubricant inlet ports adapted to be alternately covered and uncovered by said plungers, lubricant outlet ports adapted to be alternately covered and uncovered by said valve members, valve stems, fittings secured to the distributor for guiding said valve members, and adjustable means carried by said cross bar adapted to coact with said valve stems for positively moving the valve members to positions to cover said outlet ports.

4. A system for lubricating the roll necks of rolling mill rolls including a distributor adapted to force predetermined shots of lubricant to the roll neck bearings, said distributor having a plurality of cylinders, each adapted to be connected by an individual duct with a roll neck bearing, a cross head carrying plungers which reciprocate in said cylinders, a manifold common to said cylinders, respective ports in said cylinders communicating with said manifold adapted to be alternately covered and uncovered upon reciprocation of said plungers, outlet ports in said cylinders, valve members controlling the passage of lubricant through said outlet ports, said valve members having stems for guiding them longitudinally of said cylinders, and means movable in unison with said cross head coacting with said stems.

In testimony whereof, we have hereunto set our hands.
JAMES L. MILLER.
HARRY R. GILCHRIST.